(12) United States Patent
Daniel

(10) Patent No.: US 10,670,803 B2
(45) Date of Patent: Jun. 2, 2020

(54) INTEGRATED WAVELENGTH MONITOR

(71) Applicant: Lumentum Operations LLC, Milpitas, CA (US)

(72) Inventor: Brian Daniel, San Diego, CA (US)

(73) Assignee: Lumentum Operations LLC, Milpitas, CA (US)

(*) Notice: Subject to any disclaimer, the term of this patent is extended or adjusted under 35 U.S.C. 154(b) by 0 days.

(21) Appl. No.: 16/183,460

(22) Filed: Nov. 7, 2018

(65) Prior Publication Data

US 2019/0137687 A1    May 9, 2019

Related U.S. Application Data

(60) Provisional application No. 62/583,275, filed on Nov. 8, 2017.

(51) Int. Cl.
| | |
|---|---|
| G02B 6/12 | (2006.01) |
| G02B 6/42 | (2006.01) |
| G01M 11/00 | (2006.01) |
| G02B 6/293 | (2006.01) |

(52) U.S. Cl.
CPC ......... *G02B 6/12007* (2013.01); *G01M 11/00* (2013.01); *G02B 6/12004* (2013.01); *G02B 6/29341* (2013.01); *G02B 6/4286* (2013.01); *G02B 6/29338* (2013.01); *G02B 6/29344* (2013.01); *G02B 6/29353* (2013.01)

(58) Field of Classification Search
None
See application file for complete search history.

(56) References Cited

U.S. PATENT DOCUMENTS

| | | |
|---|---|---|
| 5,128,798 A | 7/1992 | Bowen et al. |
| 5,798,859 A | 8/1998 | Colbourne |
| 6,178,002 B1 | 1/2001 | Mueller-Wirts |
| 6,366,592 B1 | 4/2002 | Flanders |
| 6,526,071 B1 | 2/2003 | Zorabedian et al. |
| 6,549,548 B2 | 4/2003 | Kuznetsov et al. |
| 6,560,252 B1 | 5/2003 | Colbourne |

(Continued)

FOREIGN PATENT DOCUMENTS

WO    WO 2011/023765    3/2011

OTHER PUBLICATIONS

P. Wang et al., "Passive photonic integrated ratiometric wavelength monitor with resolution better than 15pm", Optics Express vol. 25, Feb. 3, 2017, 11 pages.

*Primary Examiner* — Chad H Smith
(74) *Attorney, Agent, or Firm* — Harrity & Harrity, LLP (57) ABSTRACT

A silicon photonics module may include a waveguide for receiving and transmitting an optical beam. The silicon photonics module may include a tap connected to the waveguide to allow measurement of an optical power of the optical beam. The silicon photonics module may include one or more splitters connected to the waveguide to tap a portion of the optical beam from the waveguide and to split the portion of the optical beam into a first part and a second part. The silicon photonics module may include a first Mach-Zehnder interferometer (MZI) to filter the first part to allow measurement of an optical power of the filtered first part. The silicon photonics module may include a second MZI to filter the second part to allow measurement of an optical power of the filtered second part.

20 Claims, 7 Drawing Sheets

(56) References Cited

U.S. PATENT DOCUMENTS

| | | |
|---|---|---|
| 6,714,566 B1 | 3/2004 | Coldren et al. |
| 6,782,017 B1 | 8/2004 | Kai et al. |
| 6,822,979 B2 | 11/2004 | Daiber |
| 7,095,776 B2 | 8/2006 | Kuznetsov et al. |
| 7,120,176 B2 | 10/2006 | McDonald et al. |
| 7,397,571 B2 | 7/2008 | Krneta et al. |
| 7,420,686 B2 | 9/2008 | Tan |
| 7,573,919 B2 | 8/2009 | Cattelan et al. |
| 7,633,624 B1 | 12/2009 | Wickholm |
| 8,179,930 B2 | 5/2012 | Musio et al. |
| 8,254,418 B2 | 8/2012 | Smith et al. |
| 8,311,067 B2 | 11/2012 | Ensher et al. |
| 9,395,504 B2 | 7/2016 | Uesaka et al. |
| 9,972,964 B2 | 5/2018 | Xiong et al. |
| 10,050,405 B2 | 8/2018 | Xiong et al. |
| 2003/0072542 A1 | 4/2003 | Furuichi |
| 2003/0133480 A1 | 7/2003 | Torazawa et al. |
| 2005/0018995 A1 | 1/2005 | Chang |
| 2011/0032529 A1 | 2/2011 | Wan et al. |
| 2011/0052207 A1 | 3/2011 | Ishikawa |
| 2012/0025714 A1 | 2/2012 | Downing, Jr. et al. |
| 2015/0155679 A1 | 6/2015 | Miyata et al. |
| 2015/0318951 A1 | 11/2015 | Zhang |
| 2016/0265898 A1* | 9/2016 | Schreuder ............... G01N 21/45 |
| 2016/0336718 A1* | 11/2016 | Takabayashi ......... H01S 5/0612 |
| 2017/0293200 A1* | 10/2017 | Jiang .................... G02F 1/3136 |
| 2017/0302052 A1 | 10/2017 | Xiong et al. |
| 2017/0353001 A1* | 12/2017 | Takabayashi ....... H01S 5/06255 |
| 2019/0044300 A1* | 2/2019 | Takabayashi ........ G02B 6/4286 |

\* cited by examiner

INTEGRATED WAVELENGTH MONITOR

RELATED APPLICATION(S)

This application claims priority under 35 U.S.C. § 119 to U.S. Provisional Patent Application No. 62/583,275, filed on Nov. 8, 2017, the content of which is incorporated by reference herein in its entirety.

TECHNICAL FIELD

The present disclosure relates to tunable lasers in optical communications systems. More particularly, some aspects of the present disclosure relate to an integrated wavelength monitor for controlling a tunable laser.

BACKGROUND

A tunable laser may be deployed in an optical communications system, such as in a transceiver, a multiplexer, a demultiplexer, and/or the like. The tunable laser may enable use of a flexible wavelength grid for the optical communications system, thereby improving flexibility of the optical communications system relative to fixed wavelength grid implementations. Tunable lasers may include indium phosphide (InP) laser chips, which may be associated with ceramic submounts, that may be deployed in the optical communications system to provide the flexible wavelength grid, and may be dynamically reconfigured to provide different wavelength optical beams during operation. In some cases, a tunable laser may be initially calibrated based on a measurement of an output of the tunable laser and using an active calibration technique. However, an aging drift relationship between electrical drive signals of the tunable laser and an output frequency of the tunable laser may exceed a threshold in optical communications systems, which may cause an initially calibrated tunable laser to lose calibration over time. Thus, a passive calibration technique may be implemented for a tunable laser by using a wavelength monitor.

In this case, the tunable laser may be optically coupled to a wavelength monitor to enable control of the tunable laser. The wavelength monitor enables closed loop frequency control of the tunable laser by providing instantaneous or near-instantaneous measurement of an optical beam being provided by the tunable laser. The wavelength monitor may include one or more calibrated wavelength filters and a set of photo detectors. For example, a first photo detector, of the wavelength monitor, may be a power monitor to measure a tapped portion of an optical beam. Further, a second photo detector, of the wavelength monitor, may be positioned at an output of one or more calibrated wavelength filters, of the wavelength monitor. The second photo detector may provide a measurement of another portion of the optical beam passed through the one or more calibrated wavelength filters.

A ratio of a first optical power measured at the first photo detector to a second optical power measured at the second photo detector may be used to generate a control signal. The control signal may be wavelength dependent and not optical power dependent, which may enable use in calibrating the tunable laser. In other words, an error measurement may be derived from a value of the control signal relative to a target calibrated value for the control signal. However, the wavelength monitor may be associated with a limited wavelength range at which calibration using the control signal is accurately performable. This may be based on sensitivities of the photo detectors in the wavelength monitor.

Thus, a Fabry-Perot type of etalon may be incorporated into the wavelength monitor to increase a sensitivity of the wavelength monitor, which may improve an accuracy of calibration. However, use of a Fabry-Perot type of etalon results in usable wavelength ranges for the wavelength monitor being discontinuous at peaks and valleys of a transmission spectrum of the etalon. The discontinuities may limit use of the wavelength monitor to fixed wavelength grid applications where the tunable laser is to be tuned only to wavelengths within the usable wavelength ranges that occur between the discontinuities.

Accordingly, for flexible wavelength grid applications, another type of wavelength monitor architecture may be used. For example, an optical signal may be separated into three optical paths and directed to three photo detectors. In this case, two optical paths of the wavelength monitor (e.g., waveguides) may include periodic wavelength filters with a common periodicity but a different phase or center frequency, such that the difference is ¼ of the common periodicity. Causing the periodic wavelength filters to differ by ¼ of the common periodicity may enable a relatively high sensitivity and a continuous usable wavelength range for calibrating the tunable laser.

In some cases, the wavelength monitor may be implemented using a set of free space optics (FSO) optical components forming the wavelength monitor. Increasingly, a density of optical components in an optical communications system is being increased, resulting in desirability of miniaturizing the optical components in the optical communications system. Thus, it may be desirable to reduce a form factor and/or a cost of a tunable laser and/or wavelength monitor components associated therewith.

SUMMARY

According to some possible implementations, a silicon photonics module may include a waveguide for receiving and transmitting an optical beam. The silicon photonics module may include a tap connected to the waveguide to allow measurement of an optical power of the optical beam. The silicon photonics module may include one or more splitters connected to the waveguide to tap a portion of the optical beam from the waveguide and to split the portion of the optical beam into a first part and a second part. The silicon photonics module may include a first Mach-Zehnder interferometer (MZI) to filter the first part to allow measurement of an optical power of the filtered first part. The silicon photonics module may include a second MZI to filter the second part to allow measurement of an optical power of the filtered second part, wherein the first MZI and the second MZI have a common free spectral range, and wherein a first peak transmission frequency of the first MZI is offset from a second peak transmission frequency of the MZI.

According to some possible implementations, a photonic integrated circuit may include a waveguide for receiving and transmitting an optical beam. The photonic integrated circuit may include a tap connected to the waveguide to allow measurement of an optical power of the optical beam. The photonic integrated circuit may include one or more splitters connected to the waveguide to split a first part and a second part from the optical beam. The photonic integrated circuit may include a first periodic filter to filter the first part to allow measurement of an optical power of the filtered first part. The photonic integrated circuit may include a second periodic filter to filter the second part to allow measurement of an optical power of the filtered second part, wherein the first periodic filter and the second periodic filter have a common free spectral range, and wherein a first peak transmission frequency of the first periodic filter is offset from a second peak transmission frequency of the second periodic filter.

According to some possible implementations, an integrated wavelength locker may include a substrate. The substrate may include a splitter to split a first part and a second part from an optical beam. The substrate may include a first wavelength filter to filter the first part to allow measurement of a first optical power of the filtered first part. The substrate may include a second wavelength filter to filter the second part to allow measurement of a second optical power of the filtered second part, wherein the first wavelength filter and the second wavelength filter have a common free spectral range, and wherein a first peak transmission frequency of the first wavelength filter is offset by ¼ the common free spectral range from a second peak transmission frequency of the second wavelength filter.

DETAILED DESCRIPTION

The following detailed description of example implementations refers to the accompanying drawings. The same reference numbers in different drawings may identify the same or similar elements.

As described above, it is advantageous to miniaturize optical components in an optical communications system. Use of a ceramic submount for a laser chip, and free space optics (FSO) for a flexible-grid wavelength monitor, may result in an excessive form factor for a transceiver in the optical communications system. Similarly, use of free space optics for a flexible-grid wavelength monitor may result in an excessive form factor for a demultiplexing element in the optical communications system. Further, use of indium phosphide (InP) laser chips, free space optics, and/or the like may result in excessive cost to manufacture optical components of the optical communications system.

Some implementations described herein provide an integrated wavelength monitor for flexible wavelength grid applications. For example, some implementations described herein may provide a substrate with a splitter, a set of wavelength filters, and a set of waveguides integrated into the substrate to allow measurements of optical powers of parts of an optical beam. Based on the measurements of the optical powers, the integrated wavelength monitor may control a tunable laser to provide a flexible wavelength grid in an optical communications system. In this way, the integrated wavelength monitor may enable control of a tunable laser (e.g., a narrow linewidth tunable laser) with a reduced form factor, a reduced cost, and/or the like relative to other non-integrated types of wavelength monitors, wavelength lockers, and/or the like.

Figure 1:
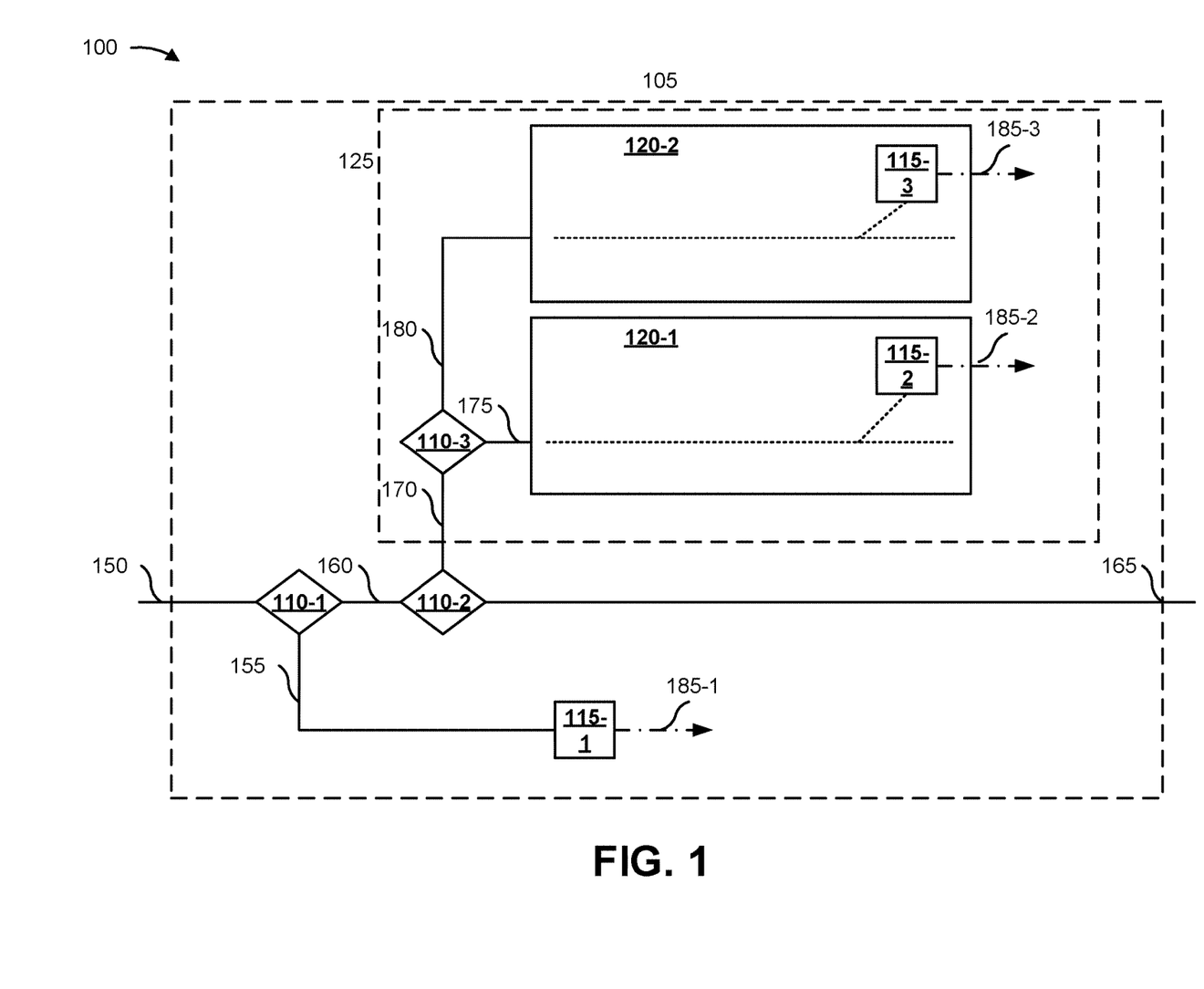
FIG. 1 is a diagram of an example implementation of an integrated wavelength monitor with a set of periodic filters described herein.

FIG. 1 is a diagram of an example implementation 100 of an integrated wavelength monitor with a set of periodic filters. As shown in FIG. 1, example implementation 100 includes an integrated wavelength monitor 105.

As further shown in FIG. 1, integrated wavelength monitor 105 may include a set of splitters 110-1, 110-2, and 110-3 (collectively, splitters 110), a set of photo detectors 115-1, 115-2, and 115-3 (collectively, photo detectors 115), and a set of wavelength filters 120-1 and 120-2 (collectively, wavelength filters 120), which may be integrated into a substrate of integrated wavelength monitor 105. In some implementations, the substrate of integrated wavelength monitor 105 may be a silicon photonics substrate, and integrated wavelength monitor 105 may be a silicon photonics module. Additionally, or alternatively, the substrate may be a photonic integrated circuit, a planar lightwave chip, an indium-phosphide module, and/or the like that integrates optical components to form an integrated wavelength monitor 105. In some implementations, the substrate may include a tunable laser integrated into the substrate and/or one or more other optical or electrical components integrated into the substrate.

As further shown in FIG. 1, integrated wavelength monitor 105 may include a set of optical paths 150-180 (i.e., 150, 155, 160, 165, 170, 175, and 180) integrated into the substrate. In some implementations, the set of optical paths 150-180 may be a set of waveguides. For example, integrated wavelength monitor 105 may include one or more waveguides on a surface of or embedded in the substrate of integrated wavelength monitor 105. In some implementations, the set of optical paths may be coupled to a tunable laser associated with providing a flexible wavelength grid. For example, optical path 150 may receive an input optical beam from a tunable laser, and may provide the input optical beam to splitter 110-1. Splitter 110-1 may divide the input optical beam, and may provide a first portion via optical path 155 to photo detector 115-1, and a second portion via optical path 160 to splitter 110-2.

In some implementations, photo detector 115-1 may perform a first measurement of a portion of the input optical beam directed to photo detector 115-1. In some implementations, photo detector 115-1 may provide an electrical output 185-1 corresponding to the first measurement. In some implementations, splitter 110-1 and photo detector 115-1 may be an integrated tap and photodiode that taps a portion of the input optical beam to enable an optical power measurement of the input optical beam. In some implementations, splitter 110-1 may be a waveguide directional coupler that directs a fixed or configurable portion of the input optical beam to photo detector 115-1.

As further shown in FIG. 1, splitter 110-2 may divide a portion of the input optical beam directed to splitter 110-2. In this case, splitter 110-2 may provide a first portion for output from integrated wavelength monitor 105 via optical path 165, and a second portion via optical path 170 to a splitter 110-3. In some implementations, splitter 110-2 may be another directional coupler that directs a fixed or configurable portion of the input optical beam to wavelength filter module 125, and another fixed or configurable portion of the input optical signal to an output of integrated wavelength monitor 105 (and to an output of an optical module that includes integrated wavelength monitor 105 and a tunable laser coupled thereto).

As further shown in FIG. 1, wavelength filters 120 of wavelength filter module 125 may receive portions of the input optical beam from the splitter 110-3 via optical path 175 and optical path 180. In some implementations, wavelength filters 120 may be periodic filters associated with differing path lengths of optical paths associated therein, as described in more detail herein. In this case, photo detector 115-2 may perform a second measurement of a filtered part of the input optical beam directed to photo detector 115-2 by wavelength filter 120-1, and may provide an electrical output 185-2 corresponding to the second measurement. Similarly, photo detector 115-3 may perform a third measurement of a filtered part of the input optical beam provided to photo detector 115-3 by wavelength filter 120-2, and may provide an electrical output 185-3 corresponding to the third measurement.

In some implementations, wavelength filters 120 may be Mach-Zehnder interferometers, as described in more detail herein. In some implementations, wavelength filters 120 may be ring resonators, as described in more detail herein. In some implementations, wavelength filters 120 may be a combination of types of periodic filters. For example, wavelength filter 120-1 may be a Mach-Zehnder interferometer and wavelength filter 120-2 may be a ring resonator. Based on wavelength filters 120 being associated with differing path lengths, as described in more detail herein, wavelength filters 120 enable a continuous wavelength range for measurements of the optical beam, thereby enabling control of the tunable laser across a flexible wavelength grid. In this way, integrated wavelength monitor 105 integrates a set of splitters 110, a set of photo detectors 115, a set of wavelength filters 120, and a set of waveguides forming a set of optical paths into an integrated silicon photonics device to perform a set of measurements to enable control of a flexible-grid tunable laser.

As indicated above, FIG. 1 is provided merely as an example. Other examples may differ from what is described herein with regard to FIG. 1.

Figure 2A:
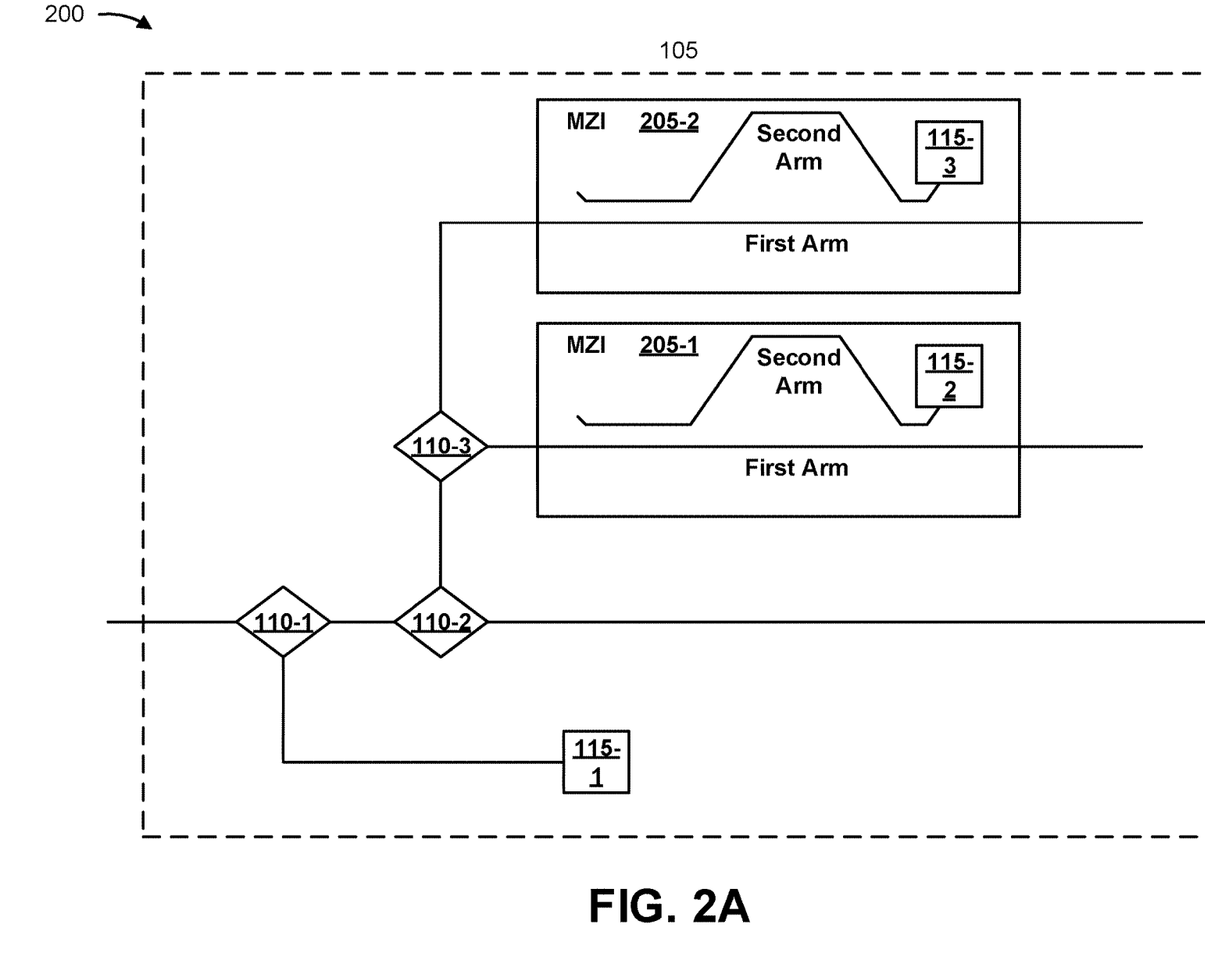
FIGS. 2A-2D are diagrams of example implementations of an integrated wavelength monitor with a set of Mach-Zehnder interferometers described herein.
Figure 2B:
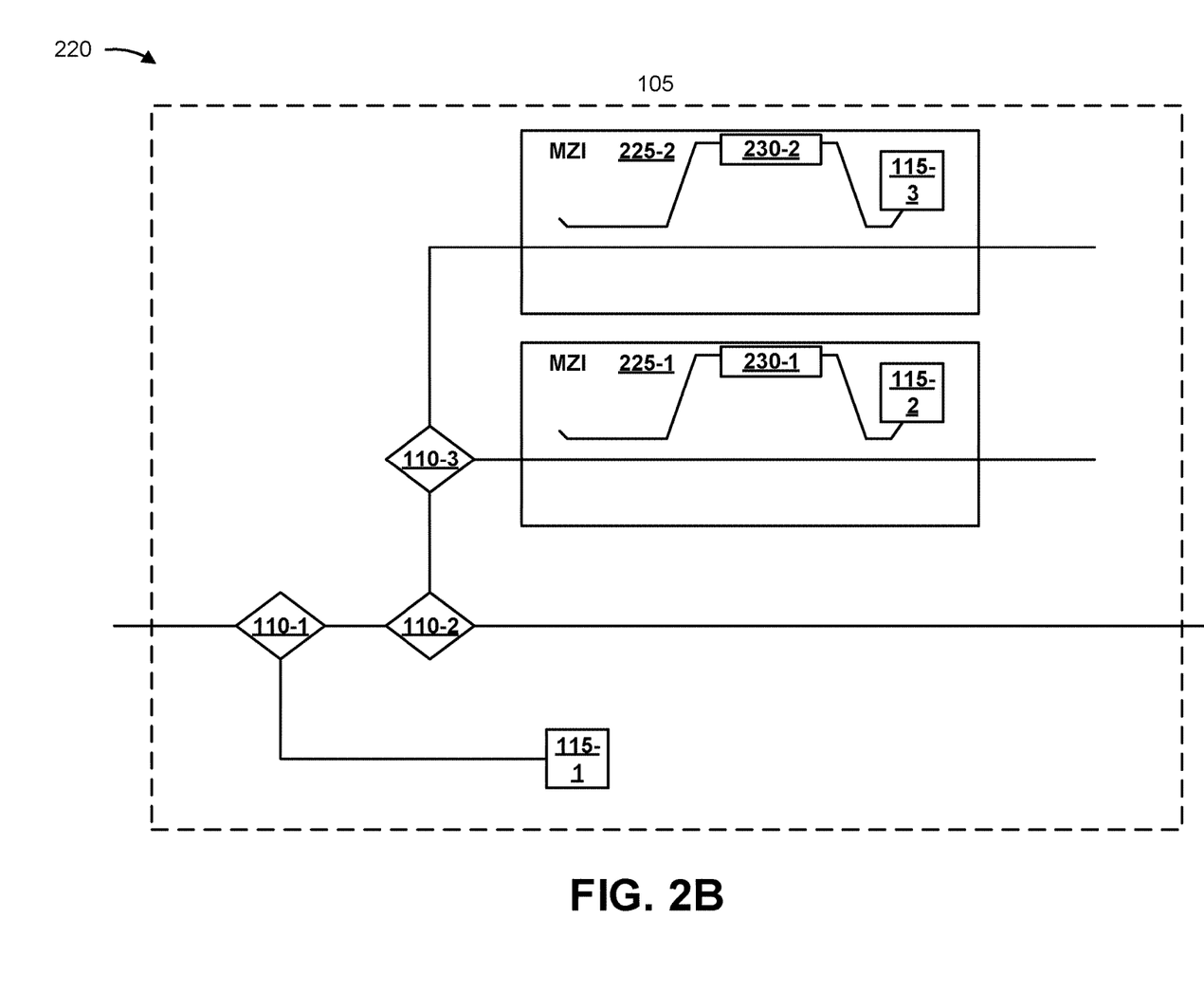
Figure 2C:
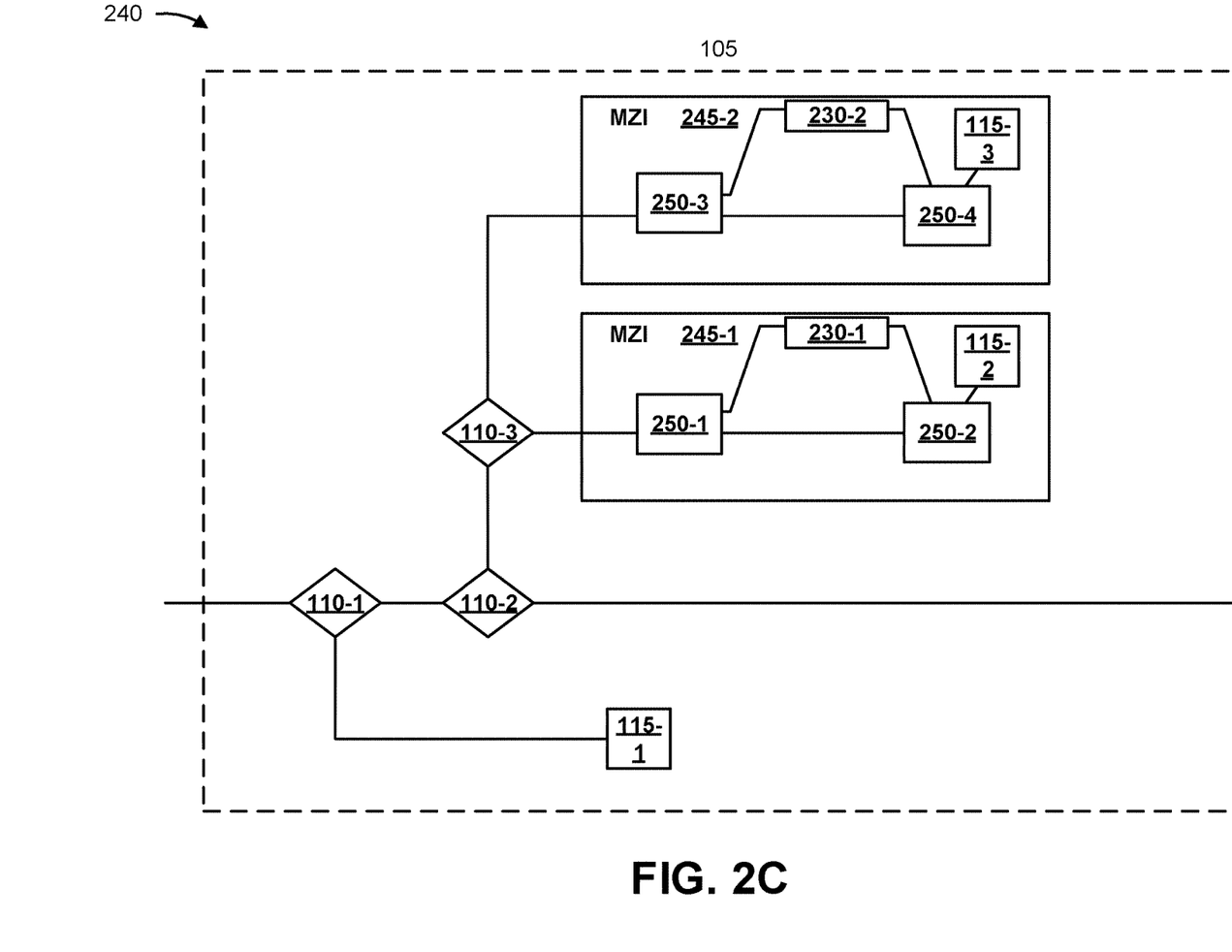

FIGS. 2A-2C are diagrams of example implementations 200/220/240 of an integrated wavelength monitor. As shown in FIGS. 2A-2C, integrated wavelength monitor 105 may include Mach-Zehnder interferometers (MZIs) as periodic filters.

As shown in FIG. 2A, an integrated wavelength monitor 105 may include an MZI 205-1 to receive a first part of an optical beam from splitter 110-3 and an MZI 205-2 to receive a second part of the optical beam from splitter 110-3. An MZI 205 (205-1, 205-2) may include a first arm with a first optical path and a second arm with a second optical path. The second optical path may include a photo detector 115. For example, MZI 205-1 includes photo detector 115-2 on a second arm, and MZI 205-2 includes photo detector 115-3 on a second arm.

In some implementations, MZIs 205 may include a set of directional couplers. For example, an MZI 205 may include a directional coupler that splits light between arms of the MZI 205. In some implementations, a directional coupler of MZI 205 may split light evenly. For example, the directional coupler may direct 3 decibel-milliwatts (dBm) of light to a first arm and 3 dBm of light to a second arm. In this way, MZI 205 may achieve a threshold level of dynamic range. In some implementations, arms of each MZI 205 may be associated with different lengths. For example, arms of MZI 205-1 may be associated with first lengths and arms of MZI 205-2 may be associated with second lengths that are different from the first lengths. In this way, arms of the MZIs 205 cause a first transmission spectrum to be directed to photo detector 115-2 of MZI 205-1 and a second transmission spectrum, that is different from the first transmission spectrum, to be directed to photo detector 115-3 of MZI 205-2.

In some implementations, the first transmission spectrum and the second transmission spectrum may vary with respect to optical frequency and periodic dependence, according to an equation:

$$T = \cos^2\left(\frac{\Delta\varphi}{2}\right),$$

where T represents a cross-port transmission spectrum and $\Delta\varphi$ represents an optical phase difference between arms of an MZI. In this case, for arms maintained at a common temperature and with a common geometry the phase difference may be determined as:

$$\Delta\varphi = \bar{n}\frac{2\pi v}{c}\Delta L$$

where $\bar{n}$ represents an effective index of a waveguide mode, v represents an optical frequency, c is the speed of light in a vacuum, and $\Delta L$ represents an arm-length difference. In this case, by varying arm lengths of the MZIs to cause different values for $\Delta L$, wavelength monitor 105 may be configured with a common free-spectral range (FSR) for MZIs 205 (e.g., an equivalent FSR or FSRs that differ by less than a threshold), but with peak transmission frequencies offset by ¼ of the FSR, which may be determined as:

$$FSR = \frac{c}{\bar{n}\Delta L}$$

$$v_k = k\frac{c}{\bar{n}\Delta L}$$

where $v_k$ represents a peak transmission frequency occurring at each integer value k, and where values of k are greater than a threshold at a frequency range of interest (e.g., an operating frequency range of integrated wavelength monitor 105 and an associated tunable laser). In this way, MZIs 205 enable measurements of optical beams input to integrated wavelength monitor 105, thereby enabling integrated wavelength monitor 105 to provide output associated with controlling a tunable laser associated with providing the optical beams.

Although some implementations described herein are described in terms of a particular offset between periodic filters (e.g., between MZIs, between ring resonators, and/or the like), other offsets may be used.

As shown in FIG. 2B, another integrated wavelength monitor 105 may include an MZI 225-1 to receive a first part of an optical beam from splitter 110-3 and an MZI 225-2 to receive a second part of the optical beam from splitter 110-3. An MZI 225 (i.e., 225-1, 225-2) may include a first arm with a first optical path and a second arm with a second optical path. The second optical path may include a photo detector 115 (115-2, 115-3) and a thermo-optic phase shifter 230 (230-1, 230-2). For example, MZI 205-1 includes a thermo-optic phase shifter 230-1 and photo detector 115-2 on a second arm, and MZI 205-2 includes thermo-optic phase shifter 230-2 and photo detector 115-3 on a second arm.

Peak transmission frequencies of an MZI may vary with regard to a shift in a waveguide effective index according to an equation:

$$\Delta v_k = \frac{\Delta \bar{n}}{\bar{n}} v_k$$

where $\Delta \bar{n}$ represents a shift in the waveguide effective index, which may result from fabrication tolerances in waveguide geometry. When fabrication tolerances between different MZIs (e.g., MZI 205-1 and MZI 205-2) are not aligned, each MZI may be associated with a different shift, resulting in the ¼ FSR peak frequency separation shifting to, for example, 0 or m/2 FSR (for integer values of m). In such a case, an effectiveness of a wavelength monitor may be reduced. As a result, thermo-optic phase shifters 230 may be incorporated into integrated wavelength monitor 105 in example implementation 220 to enable separate thermal tuning of an effective index of a waveguide mode for each MZI. In this way, a shift in the waveguide effective index may be compensated for. For example, a phase shift of π/2 may be applied using an electrical power of less than 10 milliwatts (mW), thereby compensating for differing fabrication tolerances in MZIs 225.

Figure 2D:
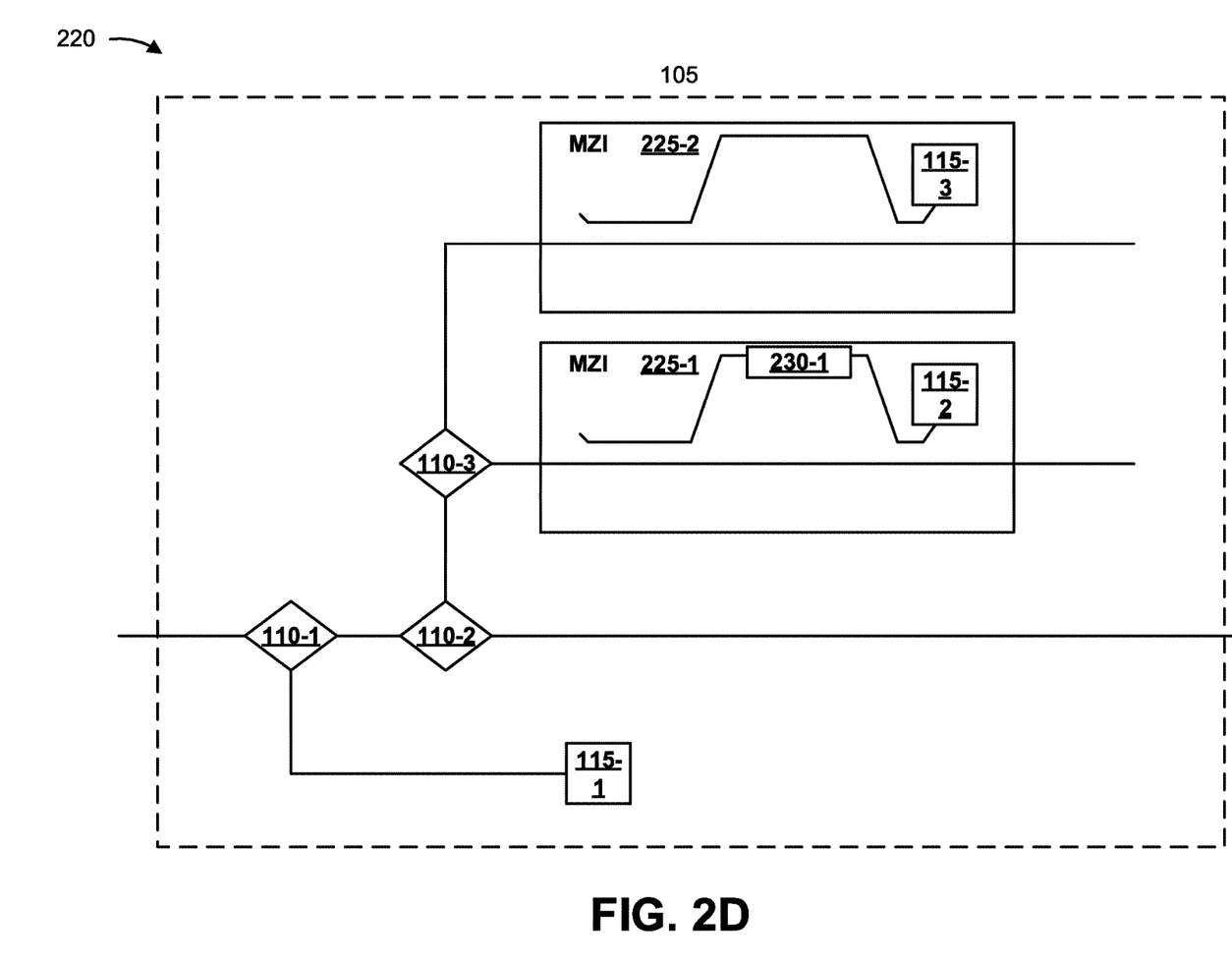

In some implementations, a single thermo-optic phase shifter 230 may be incorporated into integrated wavelength monitor 105 (e.g., in MZI 225-1), and thermal tuning may be applied to a single MZI (e.g., MZI 225-1 as shown in FIG. 2D) using the single thermo-optic phase shifter 230 to compensate for the differing fabrication tolerances of MZIs 225. In some implementations, when MZIs 225 are associated with a common arm length, the phase shift achieved using at least one thermo-optic phase shifter 230 may achieve the ¼ FSR offset between the MZIs (e.g., without using differing path lengths to achieve the ¼ FSR offset). In this way, the thermo-optic phase shifters 230 may enable control of relative phases of optical beams passing through MZI 225-1 and MZI 225-2, thereby compensating for fabrication tolerances (e.g., which may result in optical path lengths of MZIs 225 differing from a specified optical path length), ambient temperature variations (e.g., at which MZIs 225 operate), and/or the like.

As shown in FIG. 2C, another integrated wavelength monitor 105 may include an MZI 245-1 to receive a first part of an optical beam from splitter 110-3 and an MZI 245-2 to receive a second part of the optical beam from splitter 110-3. An MZI 245 (245-1, 245-2) may include a first arm with a first optical path and a second arm with a second optical path. In this case, the first arm and the second arm may be optically coupled by a coupler 250 (250-1, 250-2, 250-3, 250-4). For example, MZI 205-1 includes thermo-optic phase shifter 230-1 and photo detector 115-2 on a second arm, and the second arm is coupled to the first arm by couplers 250-1 and 250-2; and MZI 205-2 includes thermo-optic phase shifter 230-2 and photo detector 115-3 on a second arm, and the second arm is coupled to the first arm by couplers 250-3 and 250-4. In some implementations, couplers 250 may be 1×2 multi-mode interference (MMI) couplers.

As indicated above, FIGS. 2A-2C are provided merely as examples. Other examples may differ from what is described herein with regard to FIGS. 2A-2C.

Figure 3A:
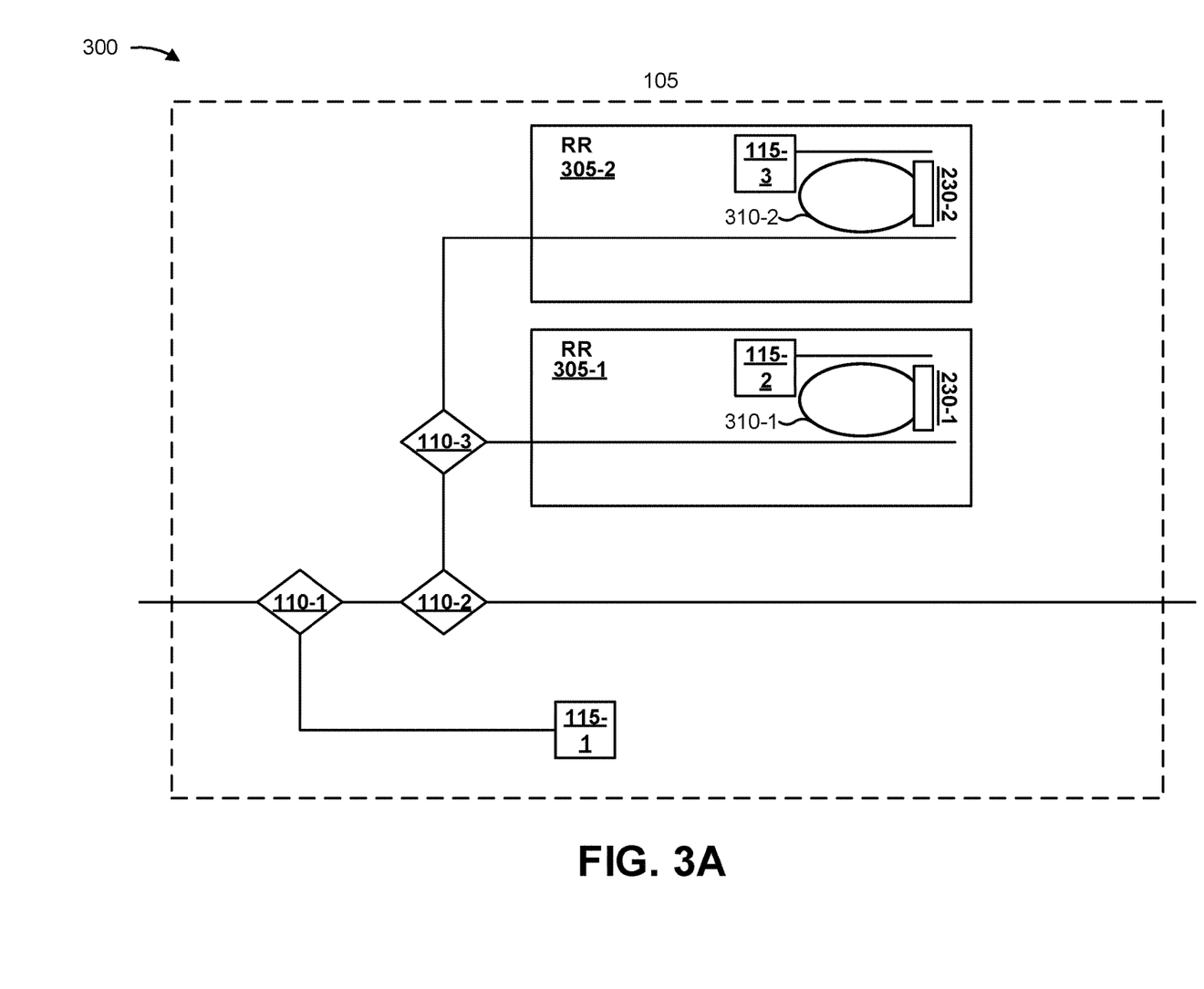
FIGS. 3A and 3B are diagrams of example implementations of an integrated wavelength monitor with a set of ring resonators described herein.
Figure 3B:
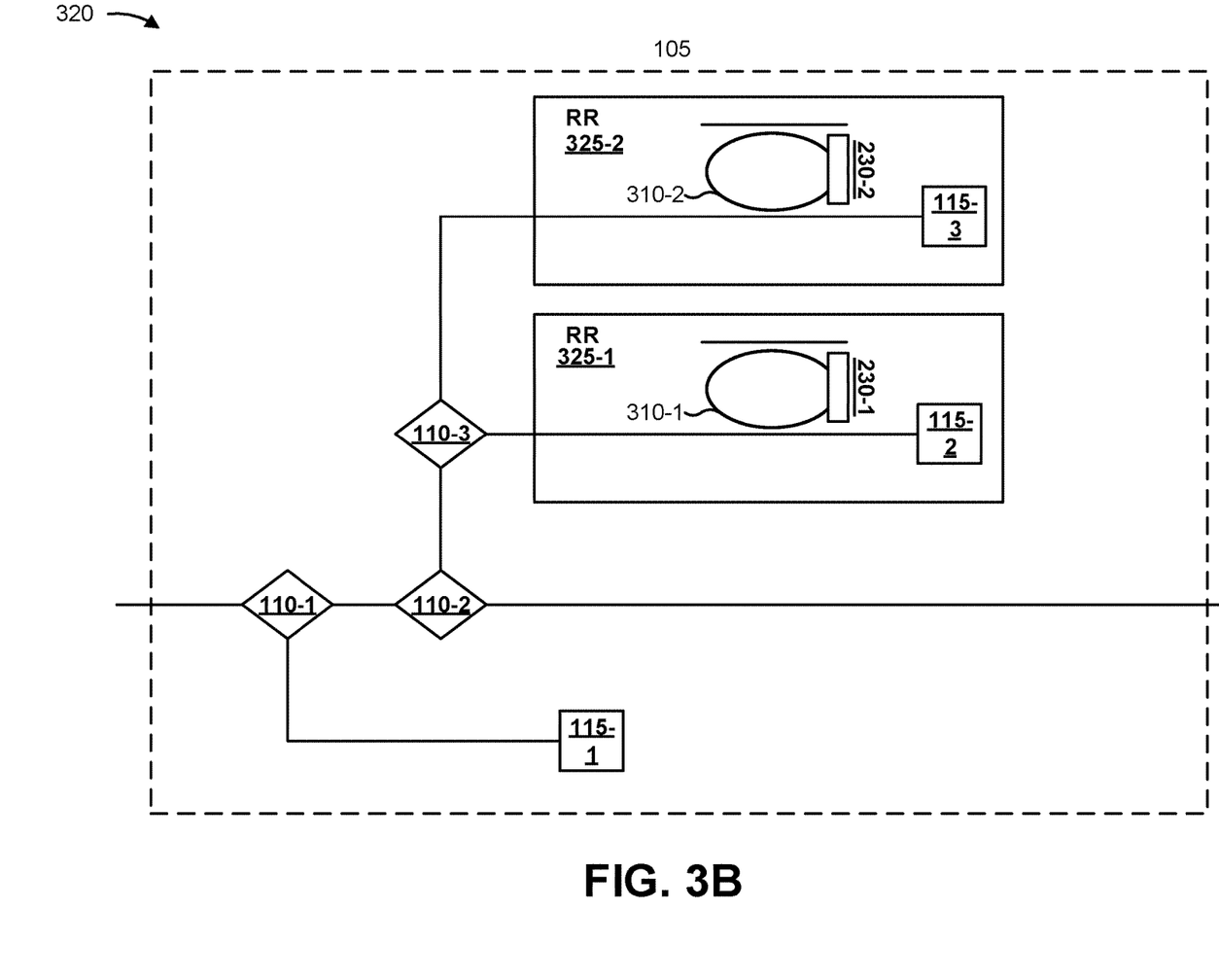

FIGS. 3A and 3B are diagrams of example implementations 300/320 of an integrated wavelength monitor. As shown in FIGS. 3A and 3B, integrated wavelength monitor 105 may include ring resonators as periodic filters.

As shown in FIG. 3A, another integrated wavelength monitor 105 may include a ring resonator (RR) 305-1 to receive a first part of an optical beam from splitter 110-3 and a ring resonator 305-2 to receive a second part of the optical beam from splitter 110-3. A ring resonator 305 (305-1, 305-2) may include a first optical path coupled to splitter 110-3, a second optical path including a photo detector 115, and a ring optical path 310 disposed between the first optical path and the second optical path. In some implementations, ring optical paths 310 (310-1, 310-2) may include respective thermo-optic phase shifters 230. For example, ring resonator 305-1 includes ring optical path 310-1, thermo-optic phase shifter 230-1, and photo detector 115-2; and ring resonator 305-2 includes ring optical path 310-2, thermo-optic phase shifter 230-2, and photo detector 115-3. In this case, ring resonators 305 include photo detectors 115 coupled to drop ports to measure parts of optical beams received from splitter 110-3.

In some implementations, ring resonators 305 may be configured with a particular phase shift. For example, ring resonators 305 may be configured such that a transmission spectrum at respective drop ports (e.g., at photo detectors 115), is an integer multiple of 2n, such that:

$$v_k = k \frac{c}{\bar{n} 2 \pi R}$$

where k represents the integer value and R represents a radius of ring optical path 310. In this case, each ring resonator 305 is associated with a different radius to achieve a ¼ FSR frequency offset between ring resonators 305. In some implementations, thermo-optic phase shifters 230 may be used to account for fabrication tolerances in, for example, ring optical path 310 to ensure the ¼ FSR frequency offset. Additionally, or alternatively, thermo-optic phase shifters 230 may be used to create the ¼ FSR frequency offset for a set of two ring resonators 305 with a common radius.

As shown in FIG. 3B, another integrated wavelength monitor 105 may include a ring resonator (RR) 325-1 to receive a first part of an optical beam from splitter 110-3 and a ring resonator 325-2 to receive a second part of the optical beam from splitter 110-3. A ring resonator 325 (325-1, 325-2) may include a first optical path coupled to splitter 110-3 and including a photo detector 115, a second optical path, and a ring optical path 310 disposed between the first optical path and the second optical path. In some implementations, ring optical paths 310 may include respective thermo-optic phase shifters 230. In this case, ring resonators 305 include photo detectors 115 coupled to through ports rather than coupled to drop ports to measure parts of optical beams received from splitter 110-3.

As indicated above, FIGS. 3A and 3B are provided merely as examples. Other examples may differ from what is described herein with regard to FIGS. 3A and 3B.

As described above, optical components of an integrated wavelength monitor 105 may be integrated onto a common substrate to enable a reduction in form factor and/or cost associated with a wavelength monitor for a flexible wavelength grid tunable laser.

The foregoing disclosure provides illustration and description, but is not intended to be exhaustive or to limit the implementations to the precise form disclosed. Modifications and variations may be made in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A silicon photonics module, comprising:
   a waveguide for receiving and transmitting an optical beam;
   a tap connected to the waveguide to allow measurement of an optical power of the optical beam;
   one or more splitters connected to the waveguide to tap a portion of the optical beam from the waveguide and to split the portion of the optical beam into a first part and a second part;
   a first Mach-Zehnder interferometer (MZI) to filter the first part to allow measurement of an optical power of the filtered first part; and
   a second MZI to filter the second part to allow measurement of an optical power of the filtered second part,
   wherein the first MZI includes a thermo-optic phase shifter and the second MZI does not include a thermo-optic phase shifter,
   wherein an arm from the first MZI and an arm from the second MZI have a common length,
   wherein the first MZI and the second MZI have a common free spectral range,
   wherein a first peak transmission frequency of the first MZI is offset from a second peak transmission frequency of the second MZI by ¼ the common free spectral range, and
   wherein the thermo-optic phase shifter is configured to provide the offset of ¼ the common free spectral range without using differing arm lengths to achieve the offset.

2. The silicon photonics module of claim 1, wherein the first MZI and the second MZI each include a plurality of multi-mode interference couplers.

3. The silicon photonics module of claim 1, wherein the first MZI comprises a first ring resonator and wherein the second MZI comprises a second ring resonator.

4. The silicon photonics module of claim 1, wherein the tap is connected to a photo detector.

5. The silicon photonics module of claim 1, wherein the thermo-optic phase shifter is on the arm from the first MZI.

6. A photonic integrated circuit, comprising:
   a waveguide for receiving and transmitting an optical beam;
   a tap connected to the waveguide to allow measurement of an optical power of the optical beam;
   one or more splitters connected to the waveguide to split a first part and a second part from the optical beam;
   a first periodic filter to filter the first part to allow measurement of an optical power of the filtered first part; and
   a second periodic filter to filter the second part to allow measurement of an optical power of the filtered second part,
   wherein the first periodic filter includes a thermo-optic phase shifter and the second periodic filter does not include a thermo-optic phase shifter,
   wherein an arm from the first periodic filter and an arm from the second periodic filter have a common length,
   wherein the first periodic filter and the second periodic filter have a common free spectral range,
   wherein a first peak transmission frequency of the first periodic filter is offset from a second peak transmission frequency of the second periodic filter by ¼ the common free spectral range, and
   wherein the thermo-optic phase shifter is configured to provide the offset of ¼ the common free spectral range without using differing arm lengths to achieve the offset.

7. The photonic integrated circuit of claim 6, wherein the first periodic filter and the second periodic filter are Mach-Zehnder interferometers.

8. The photonic integrated circuit of claim 6, wherein the one or more splitters include one or more multi-mode interference couplers or one or more directional couplers.

9. The photonic integrated circuit of claim 6, wherein the first periodic filter and the second periodic filter are ring resonators.

10. The photonic integrated circuit of claim 6,
    wherein the thermo-optic phase shifter is configurable to cause the first peak transmission frequency to be offset from the second peak transmission frequency.

11. The photonic integrated circuit of claim 6, wherein the photonic integrated circuit is a silicon photonics device.

12. The photonic integrated circuit of claim 6, wherein the tap is connected to a photo detector.

13. The photonic integrated circuit of claim 6, wherein the thermo-optic phase shifter is on the arm from the first periodic filter.

14. An integrated wavelength locker, comprising:
    a substrate comprising:
       a splitter to split a first part and a second part from an optical beam;
       a first wavelength filter to filter the first part to allow measurement of a first optical power of the filtered first part; and
       a second wavelength filter to filter the second part to allow measurement of a second optical power of the filtered second part,
          wherein the first wavelength filter includes a thermo-optic phase shifter and the second wavelength filter does not include a thermo-optic phase shifter,
          wherein an arm from the first wavelength filter and an arm from the second wavelength filter have a common length, wherein the first wavelength filter and the second wavelength filter have a common free spectral range, wherein a first peak transmission frequency of the first wavelength filter is offset by ¼ the common free spectral range from a second peak transmission frequency of the second wavelength filter, and wherein the thermo-optic phase shifter is configured to provide the offset of ¼ the common free spectral range without using differing arm lengths to achieve the offset.

15. The integrated wavelength locker of claim 14, wherein the substrate is implemented in at least one of:
a silicon photonics module,
a photonic integrated circuit,
a planar lightwave chip, or
an indium-phosphide module.

16. The integrated wavelength locker of claim 14, further comprising:
a first photo detector to allow the measurement of the first optical power;
a second photo detector to allow the measurement of the second optical power; and
a third photo detector to allow measurement of a third optical power of the optical beam.

17. The integrated wavelength locker of claim 16, wherein the first wavelength filter is a first ring resonator and the second wavelength filter is a second ring resonator; and
wherein the first photo detector is connected to a first through port of the first ring resonator and the second photo detector is connected to a second through port of the second ring resonator.

18. The integrated wavelength locker of claim 16, wherein the first wavelength filter is a first ring resonator and the second wavelength filter is a second ring resonator; and
wherein the first photo detector is connected to a first drop port of the first ring resonator and the second photo detector is connected to a second drop port of the second ring resonator.

19. The integrated wavelength locker of claim 14, wherein the substrate further comprises:
a waveguide to receive and to transmit the optical beam.

20. The integrated wavelength locker of claim 14, further comprising a tap connected to a waveguide that transmits the optical beam, and
wherein the tap is connected to a photo detector.

* * * * *